United States Patent
Suzuki (10) Patent No.: US 9,208,921 B2
(45) Date of Patent: Dec. 8, 2015

(54) ELECTROLYTE MEMBRANE AND PROCESS FOR PRODUCING THE SAME

(75) Inventor: Hiroshi Suzuki, Aichi (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 1435 days.

(21) Appl. No.: 11/988,285

(22) PCT Filed: Jul. 7, 2006

(86) PCT No.: PCT/JP2006/314013
§ 371 (c)(1),
(2), (4) Date: Jan. 4, 2008

(87) PCT Pub. No.: WO2007/007859
PCT Pub. Date: Jan. 18, 2007

(65) Prior Publication Data
US 2009/0130516 A1 May 21, 2009

(30) Foreign Application Priority Data
Jul. 8, 2005 (JP) .................................. 2005-200164

(51) Int. Cl.
*H01M 8/10* (2006.01)
*H01B 1/12* (2006.01)

(52) U.S. Cl.
CPC ............. *H01B 1/122* (2013.01); *H01M 8/1023* (2013.01); *H01M 8/1039* (2013.01); *H01M 8/1053* (2013.01); *H01M 8/1058* (2013.01); *H01M 8/1083* (2013.01); *H01M 8/1093* (2013.01);
(Continued)

(58) Field of Classification Search
USPC ........................................................ 429/477
See application file for complete search history.

(56) References Cited

U.S. PATENT DOCUMENTS

| 4,151,053 A | 4/1979 | Seko et al. |
| 4,826,616 A | 5/1989 | Tanino et al. |

(Continued)

FOREIGN PATENT DOCUMENTS

| DE | 2057802 | 7/1971 |
| DE | 2630584 | 1/1977 |

(Continued)

OTHER PUBLICATIONS

Office Action for German Patent Appl. No. 11 2006 001 746.2-45 dated May 3, 2010.

*Primary Examiner* — Ula C Ruddock
*Assistant Examiner* — Archer Dudley
(74) *Attorney, Agent, or Firm* — Finnegan, Henderson, Farabow, Garrett & Dunner, LLP (57) ABSTRACT

An electrolyte membrane 5, 5a having different EW values in different regions provides durability comparable to that of an electrolyte membrane made of a single type of ion exchange resin (i.e., an electrolyte membrane having the same EW value in its entire regions). A process for manufacturing such electrolyte membrane is also provided. Two or more kinds of ion exchange resin membranes 1 and 2 having different EW values are disposed such that their edges overlap upon each other and are then placed on a lower die 11 of a hot press 10. An upper die 12 is moved closer to the lower die 11 to press the ion exchange resin membranes 1 and 2 while at least their overlapping region 3 is heated, whereby in the overlapping region 3 the respective ion exchange resins are fused and mixed integrally. The adjacent ion exchange resin membranes are thus integrally bonded to each other in a stable manner, thus forming an electrolyte membrane 5.

4 Claims, 5 Drawing Sheets

(52) U.S. Cl.
CPC ............. *H01M 2300/0082* (2013.01); *H01M 2300/0088* (2013.01); *Y02E 60/521* (2013.01)

(56) References Cited

U.S. PATENT DOCUMENTS

| | | | | |
|---|---|---|---|---|
| 5,654,109 | A | * | 8/1997 | Plowman et al. ............ 429/494 |
| 6,723,464 | B2 | * | 4/2004 | Tabata et al. ................ 429/480 |
| 2002/0031696 | A1 | * | 3/2002 | Kawahara et al. ............ 429/30 |
| 2005/0095486 | A1 | * | 5/2005 | Hamamoto et al. ........... 429/33 |
| 2007/0031716 | A1 | * | 2/2007 | Rajendran ..................... 429/33 |

FOREIGN PATENT DOCUMENTS

| | | | | |
|---|---|---|---|---|
| DE | 38 19 947 | | 3/1989 | |
| GB | 1267619 | | 3/1972 | |
| JP | 05-006773 | | 1/1993 | |
| JP | 05-174845 | | 7/1993 | |
| JP | 09-194609 | | 7/1997 | |
| JP | 11-204119 | | 7/1999 | |
| JP | 2000-260443 | | 9/2000 | |
| JP | 2000-277130 | | 10/2000 | |
| JP | 2000277130 | * | 10/2000 | ............ H01M 8/02 |
| JP | 2001-196067 | | 7/2001 | |
| JP | 2002-164057 | | 6/2002 | |
| JP | 2002164057 | * | 6/2002 | ............ H01M 4/86 |
| JP | 2005-078975 | | 3/2005 | |
| JP | 2005-085562 | | 3/2005 | |
| JP | 2005-108770 | | 4/2005 | |
| JP | 2005-116466 | | 4/2005 | |
| JP | 2006-066124 | | 3/2006 | |

* cited by examiner

ELECTROLYTE MEMBRANE AND PROCESS FOR PRODUCING THE SAME

TECHNICAL FIELD

The present invention relates to an electrolyte membrane used in a fuel cell and to a process for producing the electrolyte membrane.

BACKGROUND ART

Figure 8:
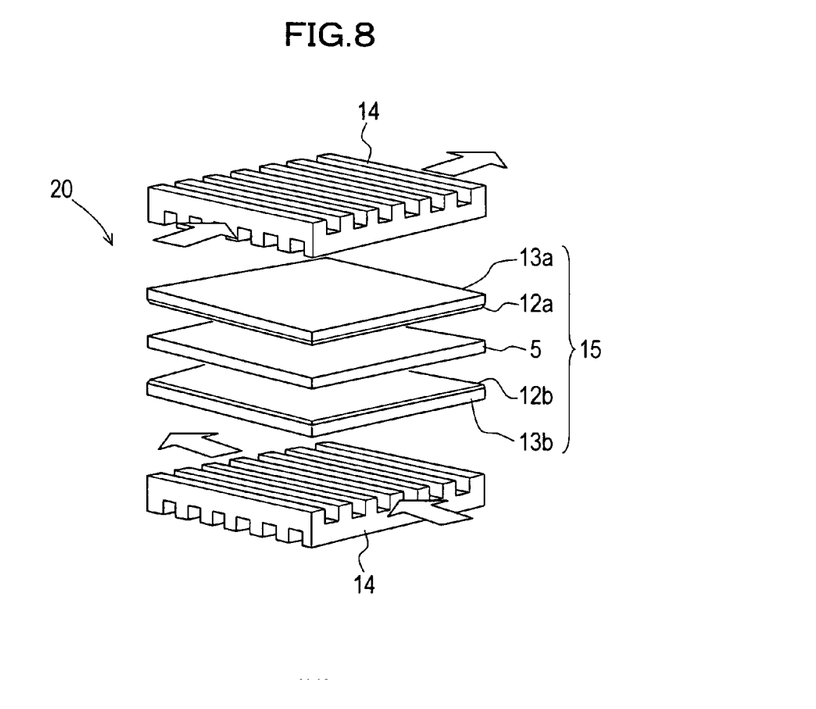
FIG. 8 schematically shows an example of a polymer electrolyte fuel cell (single cell).

As one type of fuel cell, a polymer electrolyte fuel cell (PEFC) is known. The polymer electrolyte fuel cell, as shown in FIG. 8, comprises a membrane electrode assembly (MEA) 15 as a main component. The membrane electrode assembly 15 is placed between a separator 14 having a fuel (hydrogen) gas channel and another separator 14 having an air gas channel, thus forming a single fuel cell 20 referred to as a single cell. The membrane electrode assembly 15 comprises an electrolyte membrane 5, which is an ion exchange membrane. On one side of the electrolyte membrane 5, there are stacked an anode-side electrode (catalyst layer) 12a and a diffusion layer 13a. On the other side, there are stacked a cathode-side electrode (catalyst layer) 12b and a diffusion layer 13b.

For electricity generation, as air is supplied to the cathode-side separator and fuel (hydrogen) is supplied to the anode-side separator, a reaction $H_2 \rightarrow 2H^+ + 2e^-$ proceeds at the anode, and a reaction $\frac{1}{2}O_2 + 2H^+ + e^- \rightarrow H_2O$ proceeds at the cathode side. The extent of such chemical reactions should desirably be uniform regardless of their locations in the electrodes. However, since the concentration of the gases ($H_2$, $O_2$) varies at the entry and exit sides as the reactions proceed, the electricity generation distribution inevitably becomes non-uniform if the ion conductivity of the electrolyte membrane is uniform over its entire surface.

The magnitude of ion conductivity is generally expressed by ion-exchange group equivalent weight (EW value); an electrolyte membrane with a high EW value has low ion conductivity, while an electrolyte membrane with a low EW value has high ion conductivity. In a polymer electrolyte fuel cell, typically an electrolyte membrane with an EW value that is smaller than 1500 is used. In order to overcome the aforementioned problem, i.e., to make the electricity generation distribution in the electrode surface as uniform as possible, Patent Document 1 and Patent Document 2, for example, propose the use of ion exchange resins having different EW values as the electrode or catalyst layer at the gas entry and exit sides.

In the polymer electrolyte fuel cell described in Patent Document 1, catalyst dispersed liquids are prepared with two ion exchange resins having different ion exchange capacities. The two catalyst dispersed liquids are applied to different regions to form an electrode surface such that the ion exchange capacity of the ion exchange resin at the exit side of the oxygen electrode becomes smaller than the ion exchange capacity of the ion exchange resin at the gas entry side. Namely, when forming a single cell, the EW value of the ion exchange resin at the gas entry side is made high, while the EW value of the ion exchange resin at the exit side is made low. Patent Document 2 discloses a similar technique, by which two kinds of slurry-like catalyst powder containing solutions prepared with ion exchange resins having different EW values are applied separately to form an electrode.

Patent Document 1: JP Patent Publication (Kokai) No. 2001-196067 A

Patent Document 2: JP Patent Publication (Kokai) No. 2002-164057 A

DISCLOSURE OF THE INVENTION

In the aforementioned case where ion exchange resin solutions having different EW values are applied at different regions to make an electrode surface, bonding involves a simple interface bonding which cannot provide a sufficient binding force. Ion exchange resins having different EW values are also subject to the swelling or different amounts of contraction caused by an electrochemical reaction or temperature change during electricity generation. As a result, splitting or cracking tends to occur at the interface bonding portion in the process of electricity generation. Thus, it is difficult to obtain a fuel cell having a sufficient durability with the above technique.

By preparing an electrolyte membrane by successively arranging two or more kinds of ion exchange resins having different EW values, it becomes possible to obtain a more uniform electricity generation distribution on the electrode surface, compared with an electrolyte membrane prepared with one kind of ion exchange resin. However, as mentioned above, the electrolyte membrane produced by arranging the two or more kinds of ion exchange resins by coating (casting) is also subject to splitting or cracking at the interface bonding portion, thereby failing to provide a sufficient durability as an electrolyte membrane.

In view of the foregoing, it is an object of the present invention to provide an electrolyte membrane and a process for producing the same, wherein the electrolyte membrane has different EW values at different regions, making it possible to produce a highly efficient fuel cell (membrane electrode assembly) in which the electricity generation distribution in the electrode surface is substantially uniform, the electrolyte membrane having a durability comparable to that of an electrolyte membrane made of a single type of ion exchange resin (i.e., an electrolyte membrane having the same EW value in all of the regions).

The present invention provides an electrolyte membrane comprising two or more kinds of ion exchange resin membranes having different EW values that are successively arranged. Between adjacent membranes, a region is formed in which the ion exchange resins of the respective membranes are mixed, thereby integrally bonding the both membranes.

The aforementioned electrolyte membrane comprises the region between the adjacent membranes in which the respective ion exchange resins are mixed in a molten state. In this region, the respective ion exchange resins are physically and not chemically mixed; i.e., the molecular chains of which the respective resins are composed are integrally intertwined. Their bond is therefore very strong and stable. Thus, the probability of any swelling or contraction that might occur during the electricity generation process causing peeling, splitting, or cracking in the mixed region (bonding region) can be minimized, thus providing a very durable electrolyte membrane.

An appropriate width of the mixed region of the electrolyte membrane is determined by considering the thickness of the electrolyte membrane, the electricity generation performance expected of the fuel cell produced using the electrolyte membrane, expected durability, and so on. In a normal polymer electrolyte fuel cell, a width on the order of several millimeters (10 to 4 mm) can sufficiently provide a desired result. If the width of the mixed region exceeds 10 mm, for example, problems may occur, such as the development of wrinkles or irregular surfaces due to the excess portion of the mixed region. On the other hand, if the width is less than 4 mm, for example, sufficient integration cannot be achieved at the bonding region.

The electrolyte membrane of the present invention may comprise either ion exchange resin membranes alone or it may comprise a porous reinforcing membrane impregnated with ion exchange resin membranes. The ion exchange resin may comprise an electrolyte material used in a conventional electrolyte membrane for fuel cells. An F-type electrolyte membrane made of a precursor polymer of an electrolyte polymer has thermal stability and is therefore particularly preferable for the manufacture of the electrolyte membrane of the present invention. When an F-type electrolyte membrane is used, a step (hydrolysis) of providing the electrolyte polymer with ion exchange property by a known technique (as disclosed in JP Patent Publication (Kokai) No. 9-194609 A (1997), for example) is performed to obtain an electrolyte membrane according to the invention. The porous reinforcing membrane may comprise a porous reinforcing membrane conventionally used in electrolyte membranes; particularly preferably, however, it comprises a PTFE porous membrane.

In the electrolyte membrane of the present invention, the two kinds of ion exchange resin membranes having different EW values may be successively and integrally bonded to each other. Alternatively, three or more kinds of ion exchange resin membranes having different EW values may be successively and integrally bonded to each other. In the latter case, upon assembly as a fuel cell, the ion exchange resin membranes are arranged such that their EW values successively decrease from upstream to downstream of the flow of gas (particularly the flow of oxidant gas).

The present invention also provides a process for producing the aforementioned electrolyte membrane comprising two or more kinds of ion exchange resin membranes having different EW values that are successively arranged, the process comprising the steps of:

disposing adjacent ion exchange resin membranes having different EW values such that the edges of the membranes overlap; and integrally bonding the adjacent ion exchange resin membranes by heating and pressing at least the overlapped region so as to melt and mix the ion exchange resins at least at the overlapped region thereof.

The ion exchange resin membrane as starting material may be an ion exchange resin membrane produced by a known production method. The ion exchange resin membranes are disposed on a hot press or the like such that their edges overlap upon each other with a width on the order of, preferably, several millimeters. The ion exchange resin membranes are heated such that at least their overlapping portions become molten while they are pressed. It goes without saying that the entire surfaces of the disposed ion exchange resin membranes may be heated and pressed. In this way, in the overlapping region of the adjacently disposed ion exchange resin membranes, the respective ion exchange resins are mixed in a molten state and physically mixed as mentioned above, such that the molecular chains of the respective resins are integrally intertwined with each other. Thus, a very strong and stable bonding can be obtained between the adjacent ion exchange resin membranes, and a very durable electrolyte membrane can be obtained.

The present invention further provides a process for producing an electrolyte membrane comprising two or more kinds of ion exchange resin membranes having different EW values that are successively arranged, the electrolyte membrane further comprising a porous reinforcing membrane therein, the process comprising the steps of:

disposing the two or more kinds of ion exchange resin membranes having different EW values on one or both sides of the porous reinforcing membrane such that their edges overlap upon each other; and integrally bonding the adjacent ion exchange resin membranes in the porous reinforcing membrane by heating and pressing the disposed ion exchange resin membrane so as to melt the ion exchange resins of the respective ion exchange resin membranes while the porous reinforcing membrane is simultaneously impregnated therewith, thus forming a region in which the two kinds of ion exchange resins having different EW values are mixed.

In this production process, a stronger electrolyte membrane comprising a porous reinforcing membrane inside can be obtained. In this production process, the heated ion exchange resin membranes in an entirely molten state impregnate the porous reinforcing membrane. Therefore, the ion exchange resin membrane as starting material extremely desirably comprises an F-type electrolyte membrane consisting of a precursor polymer of an electrolyte polymer that is thermally stable. Furthermore, since the porous reinforcing membrane is impregnated with the ion exchange resin membranes in an entirely molten state, the region in which their edges overlap may be narrower than that in the case of the aforementioned production process involving no porous reinforcing membrane and still a region in which the ion exchange resins are mixed as desired can be obtained.

When an F-type electrolyte membrane is used as starting material, it is necessary to perform an ion conductivity providing process by hydrolysis or other known method, following the step of integrally bonding the ion exchange resin membranes.

The present invention thus provides an electrolyte membrane having different EW values in different regions, which enables the production of a highly efficient fuel cell (membrane electrode assembly) in which a substantially uniform electricity generation distribution can be obtained in the electrode surface. The electrolyte membrane has durability comparable to that of an electrolyte membrane produced with a single kind of ion exchange resin.

BRIEF DESCRIPTION OF THE DRAWINGS

FIGS. 1a and 1b schematically show a process for producing an electrolyte membrane according to a first embodiment of the present invention, illustrating its production steps. FIG. 1a shows a state prior to applying pressure, and FIG. 1b shows a state after the application of pressure.

FIGS. 3a and 3b schematically show a process for producing an electrolyte membrane according to a second embodiment of the present invention, illustrating its production steps. FIG. 3a shows a state prior to the application of pressure, and FIG. 3b shows a state after the application of pressure.

In the drawings, the reference numerals designate the following:
1 . . . first ion exchange resin membrane; 2 . . . second ion exchange resin membrane; 5, 5a . . . electrolyte membrane; 3 . . . region in which two ion exchange resins having different EW values are mixed; 6 . . . porous reinforcing membrane; 7 . . . stack of ion exchange resin membranes and porous reinforcing membrane; 8 . . . second ion exchange resin membrane; 10 . . . hot press; 11 . . . lower die; 12 . . . upper die; 20 . . . fuel cell (single cell)

BEST MODE OF CARRYING OUT THE INVENTION

In the following, the present invention is described by way of embodiments thereof with reference made to the drawings.

Figure 1:
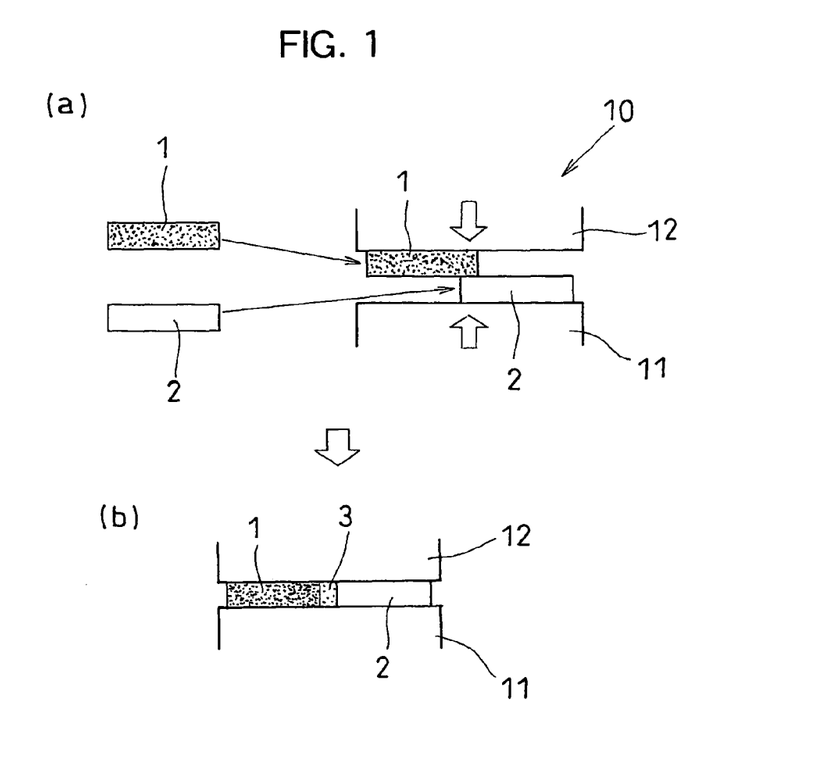

FIG. 1 shows a first embodiment in which a first ion exchange resin membrane 1 having an EW value of 1100 and a second ion exchange resin membrane 2 having an EW value of 900, for example, are integrated into an electrolyte membrane 5. In this example, the first and second ion exchange resin membranes 1 and 2, which are both F-type electrolyte membranes, i.e., conventionally known polyelectrolyte polymer membranes (such as thin films of perfluorosulfonylfluoride having a thickness on the order of 25 to 70 μm), are disposed on a lower die 11 of a hot press 10 with their edges overlapping each other by just 5 to 10 mm (FIG. 1a).

After the membranes are thus disposed, the hot press 10 is heated to 130° C. to 280° C., and then the lower die 11 and an upper die 12 are moved closer to each other so as to melt the first and second ion exchange resin membrane 1 and 2 under pressure (FIG. 1b). As a result, the overlapping portions of the ion exchange resin membranes are combined, with their ion exchange resins in a molten state, resulting in the formation of a region 3 shown in FIG. 1b where the ion exchange resins with different EW values are mixed with each other. In this region 3, the ion exchange resin with the EW value of 1100 and the ion exchange resin with the EW value of 900 are physically and not chemically mixed, where the molecular chains of the respective resins integrally intertwine with each other, and there is no interface bonding portion.

After cooling, the thus integrally joined electrolyte membrane 5 is removed from the hot press. As mentioned above, in the region 3, the molecular chains of which the respective ion exchange resins are composed intertwine integrally with each other, such that their bonding is extremely strong and stable. The electrolyte membrane 5 is then subjected to a conventionally known step of providing an electrolyte polymer with ion exchange property (hydrolysis, a process of converting $SO_2F$ at the end of sulfonylfluoride into $SO_3H^+$, for example) so as to obtain an electrolyte membrane used in fuel cells. No such ion conducting process is required if the electrolyte membrane 5 is produced using an ion exchange resin membrane of a solvent-type electrolyte material as starting material. While not shown in the drawings, the electrolyte membrane 5 can also be produced by performing the heating and press-bonding processes only at the overlapping region of the first ion exchange resin membrane 1 and the second ion exchange resin membrane 2.

Figure 2:
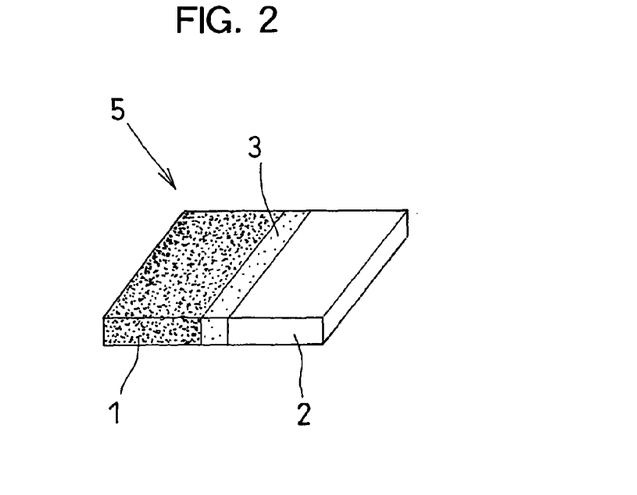
FIG. 2 schematically shows an electrolyte membrane produced by the process shown in FIG. 1.
Figure 3:
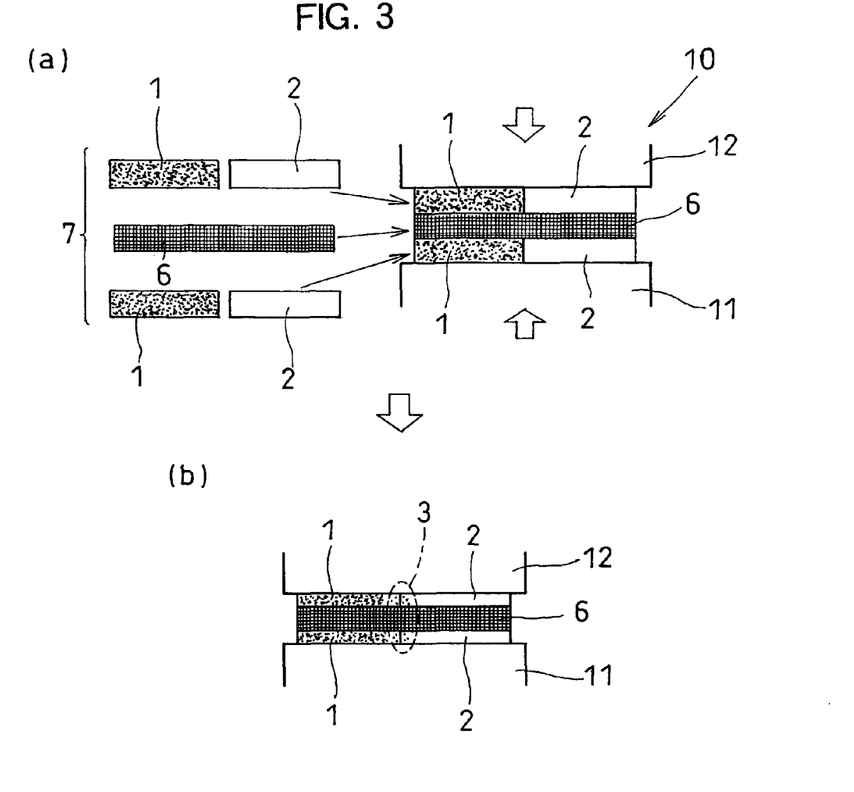
Figure 4:
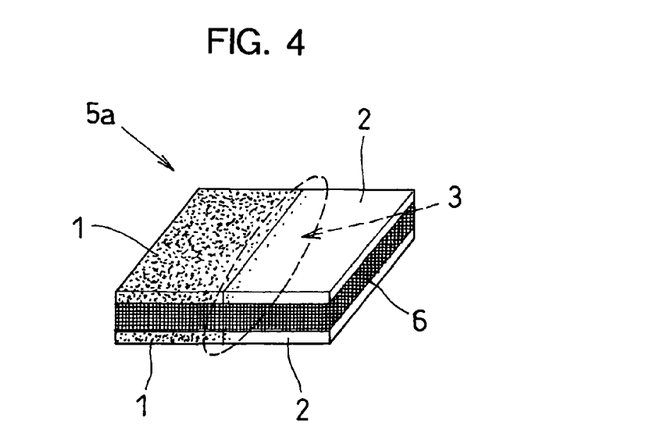
FIG. 4 schematically shows an electrolyte membrane produced by the process shown in FIG. 3.

FIG. 3 shows a second embodiment in which an electrolyte membrane 5a having a porous reinforcing membrane 6 is produced. The porous reinforcing membrane 6, which may be a porous reinforcing membrane used in conventional electrolyte membranes, is a PTFE porous membrane, for example. In the illustrated example, the same first ion exchange resin membrane 1 and second ion exchange resin membrane 2 as those shown in FIGS. 1 and 2 are disposed on a lower surface and an upper surface of the porous reinforcing membrane 6. The edges of the first ion exchange resin membrane 1 and the second ion exchange resin membrane 2 are also placed one upon the other, overlapping by several millimeters.

A resultant stack 7 is placed on top of a lower die 11 of a hot press 10 (FIG. 3a), and the hot press 10 is similarly heated to 130° C. to 280° C. The lower die 11 and the upper die 12 are then moved closer to each other to melt the first and second ion exchange resin membranes 1 and 2 while applying pressure such that the porous reinforcing membrane 6 does not become crushed (FIG. 3b). As a result, the first ion exchange resin membranes 1 and the second ion exchange resin membranes 2 enter the porous reinforcing membrane 6 from above and below, thus impregnating the porous reinforcing membrane 6, while the overlapping portions are fused together as in the case of FIG. 1. Thus, as shown in FIG. 3b, a region 3 is formed within (and on the surface of) the porous reinforcing membrane 6 in which the respective ion exchange resins having different EW values are mixed in the same way as shown in FIG. 1. The thus formed electrolyte membrane 5a may be subjected to the aforementioned process of providing ion exchange property to an electrolyte polymer as needed, whereby an electrolyte membrane for use in fuel cells is obtained.

While not shown in the drawings, it is possible to produce a similar electrolyte membrane 5a by disposing the first ion exchange resin membrane 1 and the second ion exchange resin membrane 2 on either the upper surface or the lower surface alone of the porous reinforcing membrane 6 and adjusting their film thickness.

In the present embodiment, since the first ion exchange resin membrane 1 and the second ion exchange resin membrane 2 become molten as a whole when they impregnate the porous reinforcing membrane 6, it is recommended that the ion exchange resin membrane as starting material be composed of a polymer electrolyte polymer membrane having high thermal strength. Further, since the ion exchange membranes 1 and 2 are molten as a whole when they impregnate the porous reinforcing membrane, the region in which their edges are overlapped may be narrower than the corresponding region in the case of production illustrated in FIG. 1 involving no porous reinforcing membrane 6.

Figure 5:
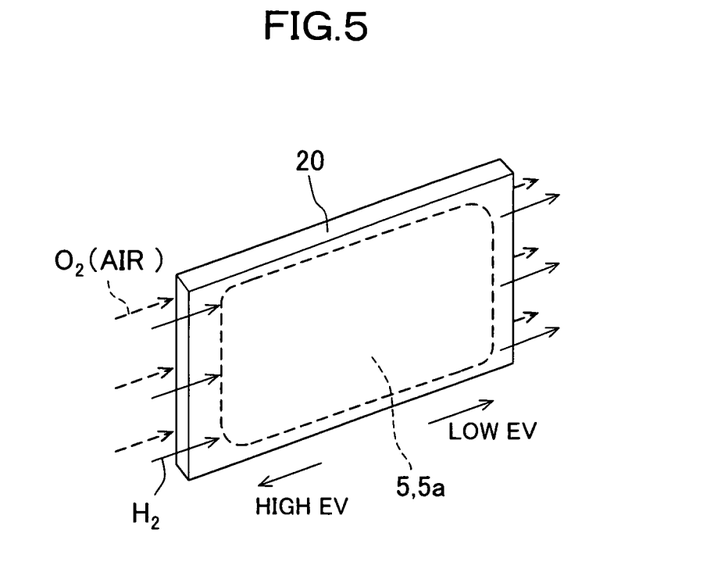
FIG. 5 schematically shows a single cell comprising the electrolyte membrane according to the present invention.

With the thus produced electrolyte membrane 5 or 5a (on which hydrolysis is optionally performed), a membrane electrode assembly is made, which is used as a single cell 20 of fuel cell. The electrolyte membrane 5 (5a) (i.e., the membrane electrode assembly) is disposed such that the first ion exchange resin membrane 1 having the high EW value (1100) is at the gas entry side while the low EW value (900) is at the gas exit side. By thus disposing the electrolyte membrane 5 (5a), a conducting membrane having lower ion conductivity (low protonic) is positioned at the gas entry side with higher gas concentration, while a conducting membrane having higher ion conductivity (high protonic) is positioned at the gas exit side with lower gas concentration, whereby a highly efficient fuel cell (single cell) can be obtained which has a substantially uniform electricity generation distribution in the electrode surface. Since the joint surfaces of the first ion exchange resin membrane 1 and the second ion exchange resin membrane 2 are integrated by the intertwining molecular chains of the respective ion exchange resins, the bonding of the joint surfaces is extremely stable, thereby contributing to the improvement in durability of the single cell.

Figure 6:
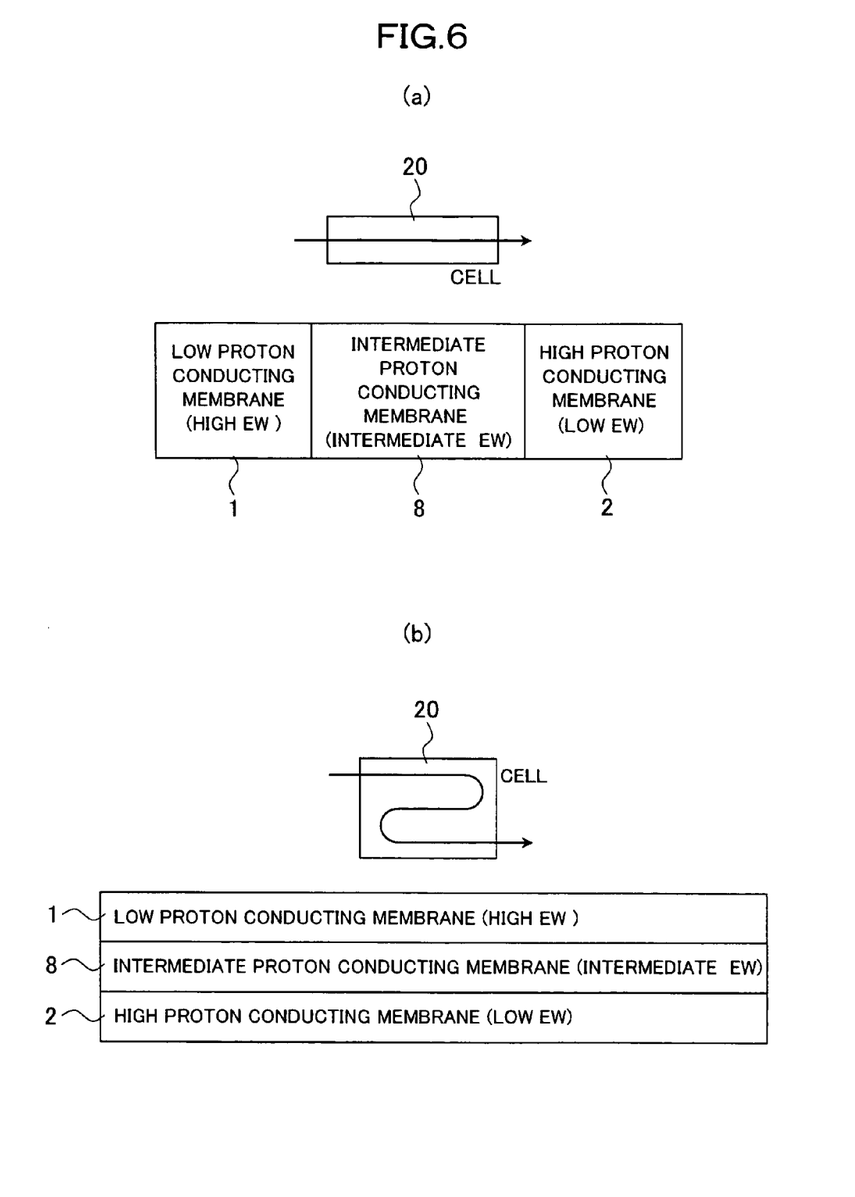
FIGS. 6a and 6b are drawings for the description of single cells according to other embodiments of the invention and the shape of the electrolyte membranes used therein.

In the foregoing description, the electrolyte membrane was made of two kinds of ion exchange resin membranes having different EW values. It is also possible, however, to produce a single electrolyte membrane using three or more kinds of ion exchange resin membranes having different EW values by arranging the membranes in successively decreasing order of EW values in the direction of gas flow. FIG. 6 shows examples in which three kinds of ion exchange resin membranes are used. In FIG. 6a, the flow of gas in the single cell 20 is linear, where a third ion exchange resin membrane 8 (having an EW value of 1000, for example) is disposed between the aforementioned first ion exchange resin membrane 1 (EW value: 1100) and the second ion exchange resin membrane 2 (EW value: 900) linearly in the direction of gas flow. In FIG. 6b, the flow of gas has an S-shaped passage in the single cell 20; in such case, the first ion exchange resin membrane 1 (EW value: 1100) is disposed at the top (upstream side), the third ion exchange resin membrane 8 (EW value: 1000) is disposed in the middle, and the second ion exchange resin membrane 2 (EW value: 900) is disposed at the bottom (downstream side). In any case, the joint portions of the individual ion exchange resin membranes 1, 8, and 2 are formed with the above-described region in which the respective ion exchange resins are mixed.

Figure 7:
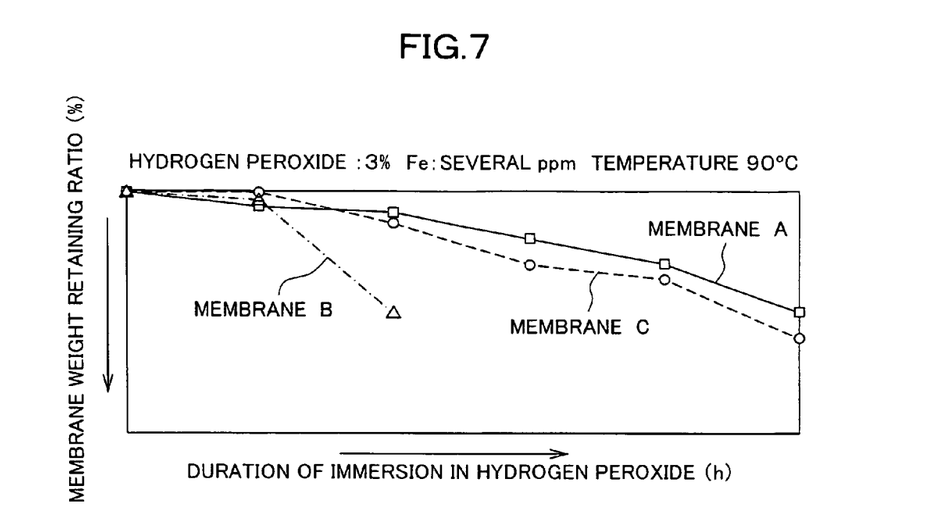
FIG. 7 shows a graph comparing the electrolyte membrane of the present invention with a conventional electrolyte membrane based on Fenton's test, which is one of methods of evaluating electrolyte membranes.

As a method for evaluating the durability of an electrolyte membrane, Fenton's test is known. The present inventors conducted Fenton's test on an electrolyte membrane (membrane A) produced by the process of the present invention using two kinds of ion exchange resins (Nafion: trade name) having different EW values, an electrolyte membrane (membrane B) produced by a known casting method by which two kinds of ion exchange resin membranes were successively arranged, and an electrolyte membrane (membrane C) using only one kind of ion exchange resin, and evaluated the durability of each membrane. The results are shown in FIG. 7. The tests, which were conducted under conditions of temperature 90° C., hydrogen peroxide: 3%, and Fe: several ppm, measured the decrease rate against the time of hydrogen peroxide immersion and plotted it chronologically in a graph.

As shown in the graph of FIG. 7, the membrane B produced by the casting method developed peeling at the boundary portion, resulting in a sharp decrease in weight in a short period. The boundary portion thereafter separated. The membrane A of the present invention exhibited a weight decrease tendency similar to that of the membrane C produced with just one kind of ion exchange resin. This shows that the bonding at the boundary portion is extremely stable and substantially no peeling developed in that portion. Thus, the production method of the invention and the electrolyte membrane produced by that method were shown to be very effective for the purpose of electrolyte membrane for fuel cells.

The invention claimed is:

1. A process for producing an electrolyte membrane comprising a first ion exchange resin and a second ion exchange resin having different ion-exchange group equivalent weight (EW) values that are successively arranged via a bonding region, the process comprising:
    disposing a first ion exchange resin membrane comprising the first ion exchange resin and a second ion exchange resin membrane comprising the second ion exchange resin such that interior edges of the membranes overlap to form an overlapping region while other portions of the membranes do not overlap; and
    integrally bonding the first ion exchange resin membrane and the second ion exchange resin membrane by heating and pressing at least the overlapping region to form the bonding region so as to melt and mix the first ion exchange resin and the second ion exchange resin at the overlapping region thereof,
    wherein the electrolyte membrane is disposed between a pair of electrodes, each electrode including a catalyst layer.

2. A process for producing an electrolyte membrane comprising a first ion exchange resin and a second ion exchange resin having different ion-exchange group equivalent weight (EW) values that are successively arranged via a bonding region, the electrolyte membrane further comprising a porous reinforcing membrane therein, the process comprising:
    disposing a first ion exchange resin membrane comprising the first ion exchange resin and a second ion exchange resin membrane comprising the second ion exchange resin such that interior edges of the ion exchange resin membranes overlap to form an overlapping region while other portions of the ion exchange resin membranes do not overlap on one or both sides of the porous reinforcing membrane; and
    heating and pressing the disposed ion exchange resin membranes so as to melt the ion exchange resins of the respective ion exchange resin membranes while the porous reinforcing membrane is simultaneously impregnated therewith, thereby integrally bonding the first ion exchange resin membrane and the second ion exchange resin membrane in the porous reinforcing membrane so as to melt and mix the first ion exchange resin and the second ion exchange resin in the overlapping region to form the bonding region,
    wherein the electrolyte membrane is disposed between a pair of electrodes, each electrode including a catalyst layer.

3. The process for producing an electrolyte membrane according to claim 1, wherein the first ion exchange resin membrane and the second ion exchange resin membrane are integrally bonded to each other by heating the overlapping region of the first ion exchange resin membrane and the second ion exchange resin membrane as a whole from both sides thereof using a hot press.

4. The process for producing an electrolyte membrane according to claim 2, wherein the first ion exchange resin membrane and the second ion exchange resin membrane are integrally bonded to each other by heating the overlapping region of the first ion exchange resin membrane and the second ion exchange resin membrane as a whole from both sides thereof using a hot press.

* * * * *